United States Patent Office
3,479,374
Patented Nov. 18, 1969

3,479,374
PREPARATION OF QUINONES
Charles W. Hargis and Howard S. Young, Kingsport,
Tenn., assignors to Eastman Kodak Company, Rochester, N.Y., a corporation of New Jersey
No Drawing. Filed Sept. 29, 1966, Ser. No. 583,066
Int. Cl. C07c 49/66
U.S. Cl. 260—396    16 Claims

ABSTRACT OF THE DISCLOSURE

A method for the production of completely dehydrogenated quinones which comprises contacting a hydroquinone, or a quinone or hydroquinone which is at least partially ring-hydrogenated, with an arsenic oxide, antimony oxide and/or bismuth oxide contact agent at an elevated temperature of about 150° C. to 600° C. to effect oxidative dehydrogenation.

This invention relates to the production of quinones. More particularly, it is concerned with the production of completely dehydrogenated quinones by oxidative dehydrogenation of hydroquinones, or partially or completely hydrogenated quinones or hydroquinones.

It has been found, according to the present invention, that by contacting a hydroquinone, or a quinone or hydroquinone which is at least partially ring hydrogenated, with a contact agent comprising an arsenic oxide, antimony oxide, bismuth oxide or a mixture of two or more such oxides, under conditions which effect oxidative dehydrogenation, there is produced from such reactants fully dehydrogenated quinones.

Representative of the hydroquinones, or partially or completely hydrogenated quinones and hydroquinones which can be used in the process and the products produced are the following compounds, with R representing hydrogen or a lower alkyl having 1 to 8 carbons in the chain but with the names given for the compounds when R is hydrogen:

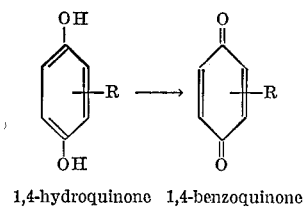

1,4-hydroquinone    1,4-benzoquinone

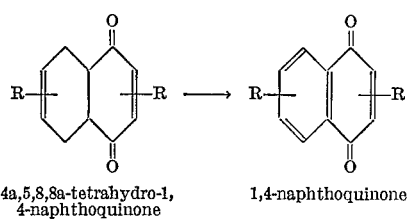

4a,5,8,8a-tetrahydro-1,    1,4-naphthoquinone
4-naphthoquinone

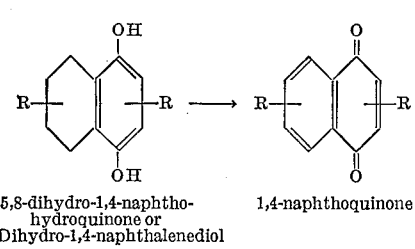

5,8-dihydro-1,4-naphtho-    1,4-naphthoquinone
hydroquinone or
5,8-Dihydro-1,4-naphthalenediol

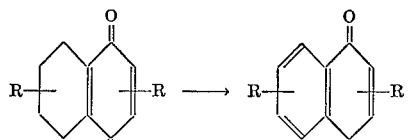

5,6,7,8-tetrahydro-1,4-naphthoqinone    1,4-naphthoquinone

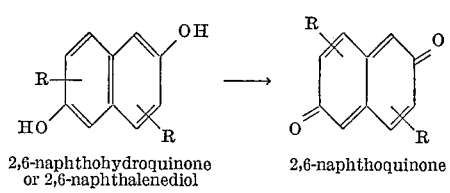

2,6-naphthohydroquinone    2,6-naphthoquinone
or 2,6-naphthalenediol

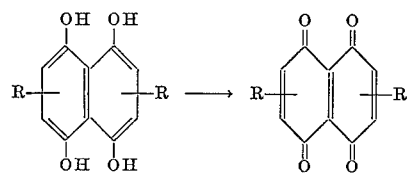

1,4,5,8-tetrahydroxynaphthalene    1,4,5,8-naphthodiquinone

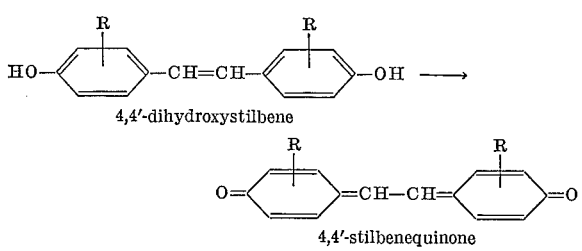

4,4'-dihydroxystilbene 4,4'-stilbenequinone

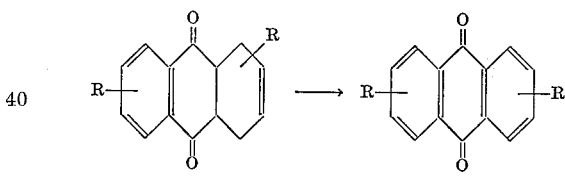

1,4,4a,10a-tetrahydroanthraquinone    5,10-anthraquinone

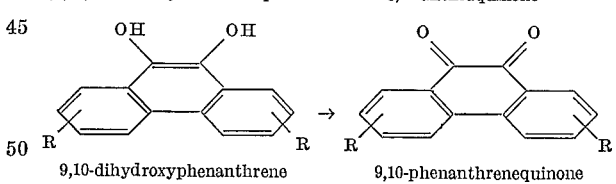

9,10-dihydroxyphenanthrene    9,10-phenanthrenequinone

The reaction is readily effected by bringing the quinone or hydroquinone reactant into contact with an arsenic oxide, antimony oxide, bismuth oxide or a mixture of two or more such oxides, at an elevated temperature which effects the oxidative dehydrogenation. Generally, a temperature of 150° C. to about 600° C. is suitable although under some circumstances lower or higher temperatures may be useful.

The reaction can be effected in the liquid or vapor phase. The liquid phase would be suitable for reactants which are not volatile under the reaction conditions. When the reactants are volatile at reaction temperatures, it is generally most satisfactory to employ a vapor-phase reaction.

The dehydrogenation can be effected in any suitable reactor of convenient design, such as of the tubular or moving-bed type. The compound to be dehydrogenated can be fed as a melt, or as a solution containing a solvent which is inert to the action of the contact mass or oxygen at the conditions of reaction, such as benzene, toluene or acetone, or it can be fed by transpiration from a heated container in a stream of gas, as for example, air or nitrogen. Other inert diluents, such as steam, can be added to a gaseous feed.

The arsenic oxide, antimony oxide, bismuth oxide or mixture of two or more such oxides can be used in any suitable physical form for effecting the reaction, although the granular form gives highly suitable results.

The desired activity is obtained from bismuth, antimony and arsenic in all oxidation states above zero made. We prefer to employ bismuth (III) oxide, antimony (IV) oxide, antimony (V) oxide or arsenic (V) oxide, or mixtures thereof, because these oxides are active at moderate reaction conditions and are readily available commercially. Frequently, antimony (IV) oxide and bismuth (III) oxide are preferred selections because these oxidants can be retained in the reaction zone and, when reduced, can be regenerated easily and economically by a simple heat treatment with air. Also, when the oxidation and thermal stabilities of the organic compound being oxidized permit, air can be fed during reaction to suppress reduction of the contact mass. When antimony (IV) oxide or bismuth (III) oxide is used as the contact agent, it is especially desirable to have oxygen or an oxygen-containing gas such as air present during the reaction to avoid depleting the oxidation activity of the contact agent. In contrast, reduced antimony (V) and arsenic (V) oxides are not returned directly to the higher valence state with air alone, nor does the simultaneous feeding of air along with the organic compound appear to suppress or prevent reduction of these higher oxides. In any event, if the contact agent is depleted or unduly lowered in activity, it will require reoxidation by suitable means to restore its activity.

The use of diluents, such as hydrocarbons, in the feed has the effect of widely extending the range of oxygen concentrations which can be used in the gaseous feed without encountering hazardous explosive mixtures.

For vapor-phase conditions, a reaction contact time of about 0.1 second to about 75 seconds is usually suitable. Contact time is the time required for the gaseous feed to fill a volume equal to the bulk volume of the contact agent at reaction conditions, assuming no reaction takes place and the perfect-gas law applies. Longer reaction times could be used for liquid-phase operation.

The quinone reaction product can be isolated from the reaction mixture by conventional means such as distillation, evaporation of solvent followed by sublimation, recrystallization or other means considered suitable by those skilled in the art.

The following examples are presented to illustrate the invention:

EXAMPLE 1

Antimony (IV) oxide was prepared by heating antimony (III) oxide at 540° C. in air. During a period of 60 min., a sample of the 4- x 20-mesh antimony (IV) oxide measuring 50 ml. in volume and contained in a 25-mm.-outside-diameter, tubular glass reactor heated to a temperature of 430° C., was contacted with 9.4 g. (0.058 mole) of 5,8-dihydro-1,4-naphthohydroquinone, fed as a 20% by weight solution in acetone and 16,980 ml. of air at standard temperature and pressure. The reaction product, consisting of a mixture of yellow solid and solution, was collected in chilled receivers into which glass-wool plugs had been inserted for retaining sublimed solid. Following rinsing of the product from the collection equipment with acetone and evaporation of the liquid at a low temperature, there was obtained a mass of 9.0 g. of yellow solid. Sublimation yielded 8.1 g. of yellow sublimate which was shown by infrared analysis to be virtually pure 1,4-naphthoquinone. Thus, the yield of pure 1,4-naphthoquinone was 88%. The presence of 5,8-dihydro-1,4-naphthohydroquinone in the crude reaction product prior to sublimation could not be detected, thereby indicating complete consumption of the starting hydroquinone.

EXAMPLE 2

The experiment of Example 1 was repeated except the reactor was packed with 50 ml. of 4- x 20-mesh-glass cullet instead of solid antimony oxide. The crude solid product obtained as in Example 1 was a mixture of black solid and liquid. Following removal of the product from the collection system as before and evaporation of the liquid at a low temperature, there was obtained an amount of black solid amounting to 81.3% by weight of the 5,8-dihydro-1,4-naphthohydroquinone fed and which was assayed to contain only 34% by weight of 1,4-naphthoquinone and 12.3% by weight of unchanged 5,8-dihydro-1,4-naphthoquinone. Thus, the conversion to 1,4-naphthoquinone was only 28.3% and the yield was only 31.6%, thereby demonstrating a much poorer level of production of desired product than obtained in the presence of antimony (IV) oxide as shown in Example 1.

EXAMPLE 3

The experiment of Example 1 was repeated except the air feed was omitted and the antimony (IV) oxide was a fresh sample which had been flushed with nitrogen prior to contact with the acetone solution of 5,8-dihydro-1,4-naphthohydroquinone. Collection of the product and sublimation as in Example 1 showed that 65% of the 5,8-dihydro-1,4-naphthohydroquinone fed had been converted to 1,4-naphthoquinone.

EXAMPLE 4

During a period of 30 min., the sample of antimony (IV) oxide which had been heated in air following use in Example 3 was contacted with 5.1 g. (0.031 mole) of 4a,5,8,8a-tetrahydro-1,4-naphthoquinone fed as a 20% by weight solution in toluene and 8,490 ml. of air at standard temperature and pressure, at a temperature of 430° C. The reaction product, a mixture of yellow solid and liquid, was removed from the collection equipment by dissolution in additional toluene. Analysis of the toluene solution by gas-liquid chromatography showed the production of 3.4 g. (0.0215 mole) of 1,4-naphthoquinone while the presence of unchanged starting 4a,5,8,8a-tetrahydro-1,4-naphthoquinone was not detected. The conversion and yield to 1,4-naphthoquinone was 69.5%.

EXAMPLE 5

The experiment of Example 4 was repeated except the reactor was packed with 50 ml. of 4- x 20-mesh-glass cullet instead of antimony (IV) oxide. Collection and analysis of the reaction product as in Example 4 failed to show the presence of 1,4-naphthoquinone. However, analysis of a purple solid collected from the receivers showed that the quinhydrone resulting from the addition of 1,4-naphthoquinone to 1,4-naphthalenediol had been obtained in approximately 10% yield.

EXAMPLE 6

The experiment of Example 1 was repeated except the antimony (IV) oxide, heated to a temperature of 435° C., was contacted with 4.62 g. (0.042 mole) of 1,4-hydroquinone, fed as a 15% by weight solution in acetone, and 5670 ml. of air at standard temperature and pressure during a period of 30 minutes. Collection of the product and analysis showed the production of 2.92 g. (0.027 mole) of 1,4-benzoquinone corresponding to a yield of the quinone of 64.3%.

In a similar manner 1,2-hydroquinone can be converted to 1,2-benzoquinone.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. The method which comprises contacting a quinone which is at least partially ring-hydrogenated, a hydroquinone, or a hydroquinone which is at least partially ring-hydrogenated, with an arsenic oxide, antimony oxide or bismuth oxide contact agent at an elevated temperature of about 150° C. to 600° C. to effect oxidative dehydrogenation and produce a fully dehydrogenated quinone or hydroquinone reactant.

2. The method of claim 1 in which a contact time of about 0.1 sec. to about 75 sec. is used to effect the oxidative dehydrogenation reaction.

3. The method of claim 1 in which oxygen gas is present during the reaction in an amount at least sufficient to suppress reduction of the contact agent to a lower state of oxidation.

4. The method of claim 3 in which the oxygen is supplied in air.

5. The method of claim 1 in which the quinone or hydroquinone is dispersed in a liquid organic diluent medium which is inert under the conditions of reaction.

6. The method of claim 1 in which the reaction is conducted in the vapor phase.

7. The method of claim 1 in which the quinone or hydroquinone is diluted with an inert gaseous medium when brought into contact with the contact agent.

8. The method of claim 1 in which 1,4-hydroquinone is oxidized to 1,4-benzoquinone.

9. The method of claim 1 in which 1,2-hydroquinone is oxidized to 1,2-benzoquinone.

10. The method of claim 1 in which a naphthohydroquinone is oxidized to a naphthoquinone.

11. The method of claim 1 in which 5,8-dihydro-1,4-naphthohydroquinone is oxidized to 1,4-naphthoquinone.

12. The method of claim 1 in which 4a,5,8,8a-tetrahydro-1,4-naphthoquinone is oxidized to 1,4-naphthoquinone.

13. The method of claim 11 in which the contact agent is antimony (IV) oxide.

14. The method of claim 12 in which the contact agent is antimony (IV) oxide.

15. The process of claim 1 in which the reactant is a compound of the formula

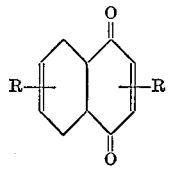

and the product obtained has the formula

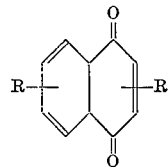

wherein R is hydrogen or a lower alkyl.

16. The process of claim 1 in which the reactant is a compound of the formula

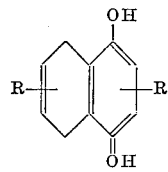

and the product obtained has the fromula

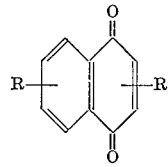

wherein R is hydrogen or a lower alkyl.

References Cited

Hargis, C. W., et al., Chemical Abstracts, vol. 61 (1964), pp. 1758h to 1759a relied on.

LORRAINE A. WEINBERGER, Primary Examiner

L. A. THAXTON, Assistant Examiner

U.S. Cl. X.R.

23—144; 260—369

PO-1050
(5/69)

UNITED STATES PATENT OFFICE
CERTIFICATE OF CORRECTION

Patent No. 3,479,374      Dated November 18, 1969

Inventor(s) Charles W. Hargis; Howard S. Young

It is certified that error appears in the above-identified patent and that said Letters Patent are hereby corrected as shown below:

Column 5, Claim 1, line 7, the phrase "from the quinone" should be inserted after the word 'quinone'.

Column 6, the formula in Claim 16 should read as follows:

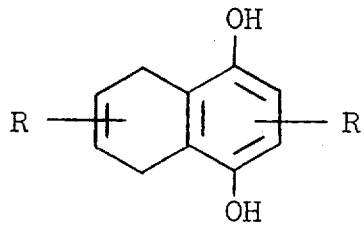

SIGNED AND
SEALED

JUN 16 1970

(SEAL)
Attest:

Edward M. Fletcher, Jr.
Attesting Officer

WILLIAM E. SCHUYLER,
Commissioner of Patents